US010269283B2

(12) United States Patent
Sun

(10) Patent No.: US 10,269,283 B2
(45) Date of Patent: Apr. 23, 2019

(54) DISPLAY PANEL AND METHOD OF ADJUSTING BRIGHTNESS THEREOF, AND DISPLAY DEVICE

(71) Applicants: BOE Technology Group Co., Ltd., Beijing (CN); Beijing BOE Optoelectronics Technology Co., Ltd., Beijing (CN)

(72) Inventor: Yong Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 175 days.

(21) Appl. No.: 15/231,060

(22) Filed: Aug. 8, 2016

(65) Prior Publication Data

US 2017/0270844 A1 Sep. 21, 2017

(30) Foreign Application Priority Data

Mar. 16, 2016 (CN) .......................... 2016 1 0151026

(51) Int. Cl.
*G09G 3/20* (2006.01)
*G06F 3/041* (2006.01)

(52) U.S. Cl.
CPC ......... *G09G 3/2003* (2013.01); *G06F 3/0416* (2013.01); *G09G 2320/0626* (2013.01)

(58) Field of Classification Search
CPC ........ G06F 3/041; G06F 3/0416; G06F 3/044; G09G 3/2003; G09G 2320/02; G09G 2320/0626
See application file for complete search history.

(56) References Cited

U.S. PATENT DOCUMENTS 7,088,343 B2 * 8/2006 Smith .................... G06F 1/1616 345/168
8,517,383 B2 * 8/2013 Wallace .............. A63F 3/00643 235/435

(Continued)

FOREIGN PATENT DOCUMENTS

CN 204028881 U 12/2014
CN 104994242 A 10/2015

(Continued)

OTHER PUBLICATIONS

Tam, Edwin "Adjusting Brightness of Display", WO2015/161495, same as PCT/CN2014/076181, International Filing Date Apr. 25, 2014, Published Oct. 29, 2015.*

(Continued)

*Primary Examiner* — Sardis F Azongha
(74) *Attorney, Agent, or Firm* — Westman, Champlin & Koehler, P.A.

(57) ABSTRACT

The present disclosure provides a display panel and a method of adjusting brightness thereof, and a display device. The display panel comprises a slide detection unit including at least two electrodes independent of each other, a sensor and a processor. The slide detection unit is configured to sense a sliding touch action made by a user within a preset touch region of the display panel, the sensor is configured to sense values of currents passing through the electrodes of the slide detection unit when the sliding touch action is made by the user and to send the values of currents to the processor. The currents are generated due to the sliding touch action. The processor is configured to determine a sliding direction of the sliding touch action based on the values of the currents, and to adjust screen brightness of the display panel based on the sliding direction.

19 Claims, 4 Drawing Sheets

(56) References Cited

U.S. PATENT DOCUMENTS

| | | | | |
|---|---|---|---|---|
| 8,654,524 | B2 * | 2/2014 | Pance | G06F 1/1616<br>345/177 |
| 8,880,204 | B2 * | 11/2014 | Frei | H04L 29/1249<br>700/90 |
| 9,110,545 | B2 * | 8/2015 | Radivojevic | G06F 3/04883 |
| 9,224,790 | B2 * | 12/2015 | Yeh | G06F 3/0412 |
| 9,325,516 | B2 * | 4/2016 | Pera | H04L 12/2803 |
| 9,898,128 | B2 * | 2/2018 | Oda | G06F 3/0416 |
| 2006/0238517 | A1 * | 10/2006 | King | G06F 1/1626<br>345/173 |
| 2013/0239057 | A1 * | 9/2013 | Ubillos | G06F 3/04855<br>715/833 |
| 2015/0042588 | A1 * | 2/2015 | Park | G06F 3/0412<br>345/173 |
| 2016/0334868 | A1 * | 11/2016 | Pacheco | G06F 3/013 |
| 2017/0285907 | A1 | 10/2017 | Li et al. | |

FOREIGN PATENT DOCUMENTS

| | | | |
|---|---|---|---|
| CN | 105117060 | A | 12/2015 |
| CN | 105138268 | A | 12/2015 |

OTHER PUBLICATIONS

First Office Action, including Search Report, for Chinese Patent Application No. 201610151026.5, dated Jun. 1, 2018, 19 pages.

* cited by examiner

DISPLAY PANEL AND METHOD OF ADJUSTING BRIGHTNESS THEREOF, AND DISPLAY DEVICE

CROSS-REFERENCE TO RELATED APPLICATION

This application claims the benefit of the Chinese Patent Application No. 201610151026.5 filed on Mar. 16, 2016 in the State Intellectual Property Office of China, the whole disclosure of which is incorporated herein by reference.

BACKGROUND OF THE INVENTION

Field of the Invention

Embodiments of the present disclosure generally relate to the field of display technologies, and particularly, to a display panel and a method of adjusting brightness thereof, and a display device.

Description of the Related Art

With development of display technologies, questions concerned by technicians are in that, while improving user experience, whether or not brightness of a display panel is suitable for surrounding environment, and whether or not the screen brightness display panel can be automatically adjusted.

Currently, most handheld devices typically have a function of modifying brightness of their display screens. For example, as for a former feature phone, setting brightness of its screen can only be done by pressing key(s) of the phones to enter a third level menu or even a fourth level menu, selecting a corresponding application, adjusting the brightness in the application, and then exiting the application. Thus, the brightness of the display screen can not be adjusted quickly and easily by a user, resulting in a poor user experience. With the development of smart phones, smart phones have been widely used in various application fields and provided with shortcut menu(s). Usually, however, the shortcut menu(s) should be pulled down from a top end of the screen to set the brightness of the screen, which will affect operation of a currently operated application. For example, when a movie is being displayed and brightness of the screen needs to be adjusted, the adjustment can be performed after a shortcut menu(s) has been pulled down from the top end of the screen, thereby user experience is adversely affected. Further, asthenopia and myopia of eyes will easily appear due to long time watching a screen of a mobile phone, and the stronger the screen brightness is, the larger an irritation to eyes is. Thus, the screen brightness needs to be adjusted timely in order to protect the eyes.

In sum, adjustment of screen brightness of a prior art display panel is relatively complicated and adversely affects user experience.

SUMMARY

Embodiments of the present disclosure provide a display panel and a method of adjusting brightness thereof, and a display device, for easily and quickly adjusting the screen brightness of the display panel without affecting user experience.

Embodiments of the present disclosure provides a display panel, comprising a slide detection unit comprising at least two electrodes independent of each other, a sensor and a processor, wherein the slide detection unit is configured to sense a sliding touch action made by a user within a preset touch region of the display panel;

the sensor is configured to sense values of currents passing through the electrodes of the slide detection unit when the sliding touch action is made by the user within the preset touch region and to send the values of the currents to the processor, the currents being generated due to the sliding touch action; and the processor is configured to determine a sliding direction of the sliding touch action based on the values of the currents, and to adjust screen brightness of the display panel based on the sliding direction.

In one possible implementation, in the above display panel provided according to embodiments of the present disclosure, the electrodes of the slide detection unit are identical in structure and are arranged such that they have the same orientation.

In one possible implementation, in the above display panel provided according to embodiments of the present disclosure, the electrodes are provided within the preset touch region.

In one possible implementation, in the above display panel provided according to embodiments of the present disclosure, an input end of the sensor is connected with the slide detection unit and an output end of the sensor is connected with the processor.

In one possible implementation, the above display panel provided according to embodiments of the present disclosure further comprises resistors arranged to connect the sensor with the electrodes of the slide detection unit. Preferably, each electrode is connected with the sensor via at least one of the resistors.

In one possible implementation, in the above display panel provided according to embodiments of the present disclosure, the slide detection unit is located between a volume-up control device and a volume-down control device of the display panel.

In one possible implementation, in the above display panel provided according to embodiments of the present disclosure, the electrodes of the slide detection unit each have a straight line, a straight bard, a bended line, or arrow shape and are arranged in an up and down direction or a right and left direction of the display panel.

In one possible implementation, in the above display panel provided according to embodiments of the present disclosure, the processor is configured to determine the sliding direction based on changes in the values of the current from respective electrodes.

In one possible implementation, the above display panel provided according to embodiments of the present disclosure further comprises a camera connected with the processor and configured to acquire an image of an eye of the user and send the acquired image to the processor, and the processor is further configured to adjust the screen brightness of the display panel based on an opening degree of the eye in the acquired image.

Correspondingly, embodiments of the present disclosure further provide a display device, comprising the above display panel provided according to embodiments of the present disclosure.

Correspondingly, embodiments of the present disclosure further provide a method of adjusting brightness of the above display panel provided according to embodiments of the present disclosure, comprising:

receiving the values of currents sent from the sensor, the currents being generated due to the sliding touch action made by the user within the preset touch region and passing through the electrodes of the slide detection unit; and determining the sliding direction of the sliding touch action made by the user within the preset touch region based on the values of currents, and adjusting the screen brightness of the display panel based on the sliding direction.

In one possible implementation, in the above method of adjusting brightness of the above display panel provided according to embodiments of the present disclosure, determining the sliding direction of the sliding touch action is made by the user within the preset touch region based on the value of current comprises:

performing data acquisition on the slide detection unit in a first direction by the sensor, determining that the sliding touch action is made by the user in the first direction within the preset touch region if the values of the currents received from the respective electrodes reduce gradually in the first direction; and determining that the sliding touch action is made by the user in a second direction opposite to the first direction within the preset touch region if the values of current received from the respective electrodes reduce gradually in the second direction.

In one possible implementation, adjusting the screen brightness of the display panel based on the sliding direction comprises:

lowering the screen brightness of the display panel when it is determined that the sliding touch action is made by the user in the first direction within the preset touch region; and raising the screen brightness of the display panel when it is determined that the sliding touch action is made by the user in the second direction within the preset touch region.

The display panel provided according to embodiments of the present disclosure comprises a slide detection unit including at least two electrodes independent of each other, a sensor and a processor. The slide detection unit is configured to sense a sliding touch action made by a user within a preset touch region of the display panel, the sensor is configured to sense the values of the currents generated by the electrodes of the slide detection unit when the sliding touch action is made by the user within the preset touch region, and to send the values of currents to the processor, and the processor is configured to determine a sliding direction in which the sliding touch action is made by the user within the preset touch region based on the values of the currents, and to adjust screen brightness of the display panel based on the sliding direction. Thus, the values of currents, which is generated by the slide detection unit of the display panel when the sliding touch action is made by the user within the preset touch region, is sensed by the sensor of the display panel and sent to the processor, and screen brightness of the display panel is adjusted by the processor based on a change in the values of currents. Thereby, with the display panel according to the embodiments of the present disclosure, adjustment of the brightness of the display panel can be achieved only through the sliding touch action made within the preset touch region of the display panel, thereby improving user experience.

DETAILED DESCRIPTION OF PREFERRED EMBODIMENTS

Figure 1:
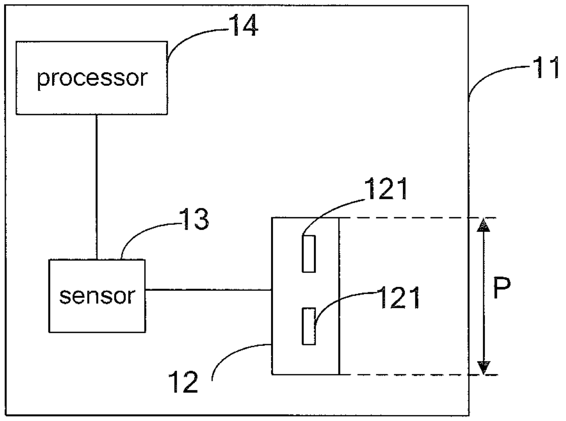
FIG. 1 is a schematic drawing showing a structure of a display panel according to an embodiment of the present disclosure.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure provide a display panel and a method of adjusting brightness thereof, and a display device, for easily and quickly adjusting the screen brightness of the display panel without affecting user experience.

Hereinafter, exemplary embodiments of the display panel and the method of adjusting brightness thereof, and the display device will be described in detail with reference to the drawings.

Referring to FIG. 1, a display panel 11 is provided according to an embodiment of the present disclosure. The display panel comprises a slide detection unit 12 including at least two electrodes 121 independent of each other, a sensor 13 and a processor 14; preferably, the at least two electrodes 121 are identical in structure and are arranged such that they have the same orientation; wherein the slide detection unit 12 is configured to sense a sliding touch action made by a user within a preset touch region P of the display panel;

the sensor 13 is configured to sense values of currents generated due to the sliding touch action and passing through the electrodes 121 of the slide detection unit when the sliding touch action is made by the user within the preset touch region P, and to send the values of the currents to the processor; and the processor 14 is configured to determine a sliding direction in which the sliding touch action is made by the user within the preset touch region based on the values of the currents, and to adjust screen brightness of the display panel based on the sliding direction.

It is noted that the slide detection unit provided in this embodiment of the present disclosure includes at least two electrodes that are identical in structure, and the electrodes are configured to form a capacitor together with a finger, a palm or other parts of the user or with other touch devices, thereby the sliding direction of the user is detected via the electrodes. The electrodes may be configured to have various shapes, and preferably, the electrodes are arranged in the same direction within the preset touch region. The number of the electrodes may be two or more than two, such that a change (for example, variation trend or direction) in the values of the currents generated by the electrodes can be detected. The structure, the shape and the number of the electrodes are not particularly limited in embodiments of the present disclosure.

Figure 2:
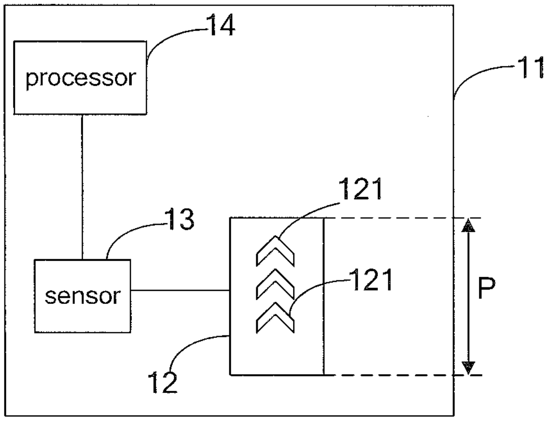
FIG. 2 is a schematic drawing showing a structure of a slide detection unit according to an embodiment of the present disclosure.
Figure 3:
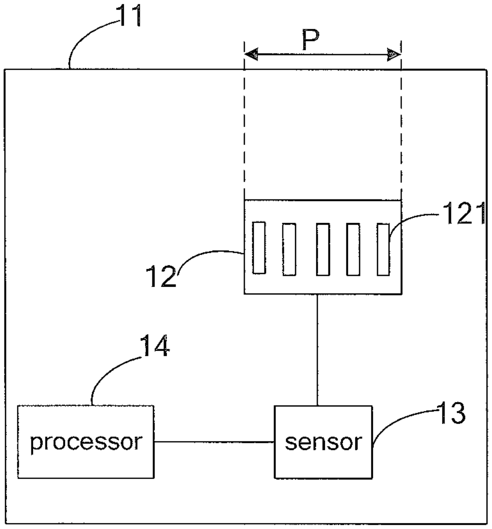
FIG. 3 is a schematic drawing showing a structure of a slide detection unit according to another embodiment of the present disclosure.

In an example, as shown in FIG. 1, the electrodes 121 of the slide detection unit 12 each have a straight line or vertical bar shape, and the slide detection unit 12 comprises two electrodes 121 arranged in an up and down direction. In another example, as shown in FIG. 2, the electrodes 121 of the slide detection unit 12 each have a bended line or arrow shape, and the slide detection unit 12 comprises three electrodes 121 arranged in the up and down direction. In a further example, as shown in FIG. 3, the electrodes 121 of the slide detection unit 12 each have a straight line or vertical bar shape, and the slide detection unit 12 comprises five electrodes 121 having the same structure and arranged orderly in a right and left direction.

The above arrangements of the slide detection unit are described above by way of examples. In practice, the arrangement of the slide detection unit is not limited to those described in the embodiments of the present disclosure, and may include other arrangements known to those skilled in the art, thus, a specific arrangement of the slide detection unit is not limited herein.

It is noted that the sensor provided in the embodiments of the present disclosure may include any device having a current sensing function, thus, a type or model of the sensor is not limited in the embodiments of the present disclosure. The processor in the embodiments of the present disclosure may be a central processing unit (CPU) in the display panel or other hardware or software having a control function, thus, a type of the processor is not particularly limited in the embodiments of the present disclosure.

The display panel provided according to the embodiments of the present disclosure comprises a slide detection unit including at least two electrodes independent of each other, a sensor and a processor. The slide detection unit is configured to sense a sliding touch action made by a user within a preset touch region of the display panel, the sensor is configured to sense values of currents generated by the electrodes of the slide detection unit when the sliding touch action is made by the user within the preset touch region and to send the values of currents to the processor, and the processor is configured to determine a sliding direction in which the sliding touch action is made by the user within the preset touch region based on the values of the currents and to adjust screen brightness of the display panel based on the sliding direction. Thus, the values of the currents, which is generated by the slide detection unit of the display panel when the sliding touch action is made by the user within the preset touch region, is sensed by the sensor of the display panel and sent to the processor, and screen brightness of the display panel is adjusted by the processor based on the change in the values of currents. Thereby, with the display panel according to the embodiments of the present disclosure, adjustment of the brightness of the display panel can be achieved through the sliding touch action made within the preset touch region of the display panel, thereby improving user experience.

In the display panel according to a preferable embodiment of the present disclosure, as shown in FIG. 1, a region where the electrodes 121 are disposed is the preset touch region P.

Exemplarily, in order to increase an area or range of the preset touch region, the slide detection unit may include three or more electrodes arranged in the same direction, such that the region where the electrodes are located is increased, and in turn, the area or range of the preset touch region is increased. When the electrodes are arranged in the same direction, an interval between adjacent electrodes is not particularly limited in the embodiments of the present disclosure. Preferably, three or more electrodes may be arranged within the preset touch region so as to increase sensitivity of the preset touch region.

In the display panel according to a preferable embodiment of the present disclosure, as shown in FIG. 1, an input end of the sensor 13 is connected with the slide detection unit 12, and an output end of the sensor 13 is connected with the processor 14.

Figure 4:
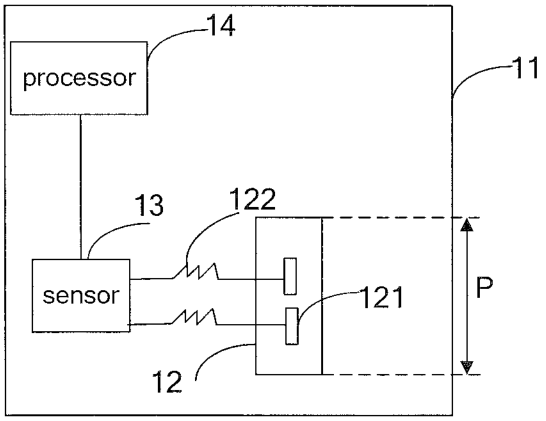
FIG. 4 is a schematic drawing showing a structure of a display panel according to a further embodiment of the present disclosure.

In the display panel according to a preferable embodiment of the present disclosure, as shown in FIG. 4, the display panel 11 further comprises a plurality of resistors 122 arranged in a one-to-one correspondence with the electrodes 121, and each of the resistors 122 connects the sensor 13 with a corresponding electrode 121 of the slide detection unit.

Figure 5:
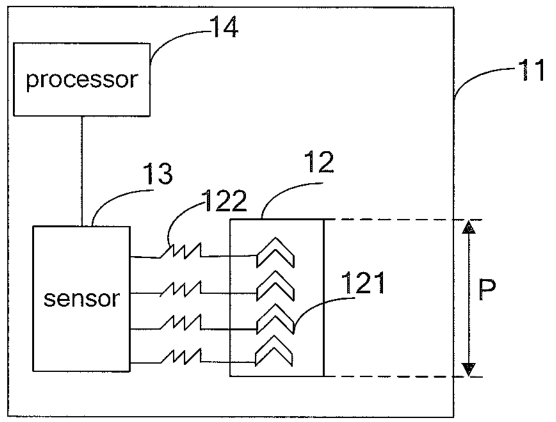
FIG. 5 is a schematic drawing showing a structure of a display panel according to a still further embodiment of the present disclosure.

Exemplarily, in order to prevent a breakdown of the electrodes of the slide detection unit due to a relative large current between the sensor and the slide detection unit, the resistors are provided between the electrodes of the slide detection unit and the sensor, and a resistance of each resistor is not particularly limited in the embodiments of the present disclosure. For example, as shown in FIG. 4, the slide detection unit comprises two electrodes, thus, two resistors are provided in a one-to-one correspondence with the electrodes. Further, as shown in FIG. 5, the slide detection unit comprises four electrodes 121, thus, four resistors 122 are provided. Of course, if a resistance of one resistor is small, providing two or more resistors between one electrode and the sensor can be anticipated, and thus, the number of the resistors is not particularly limited in the embodiments of the present disclosure.

Figure 6:
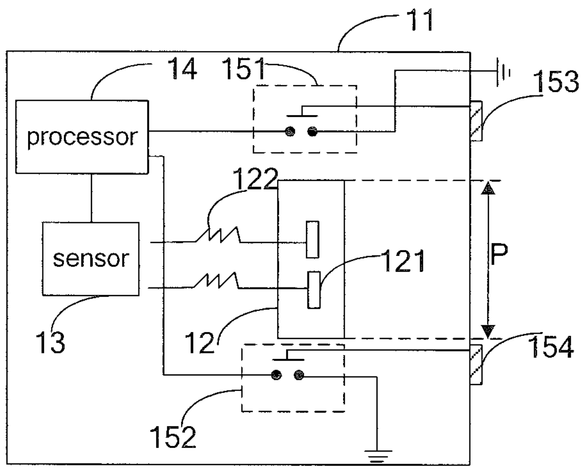
FIG. 6 is a schematic drawing showing a structure of a display panel according to a still further embodiment of the present disclosure.

In the display panel according to a preferable embodiment of the present disclosure, as shown in FIG. 6, the slide detection unit 12 is located between a volume-up control device 151 and a volume-down control device 152 of the display panel.

In an example, in order to avoid an increase in area of the display panel or an adverse influence on normal display of the display panel due to the addition of the slide detection unit, in a preferable embodiment of the present disclosure, the slide detection unit is provided between the volume-up control device and the volume-down control device. For example, the preset touch region is located between a volume-up function key and a volume-down function key. Referring to FIG. 6, the preset touch region corresponding to the slide detection unit is located between the volume-up function key 153 connected with the volume-up control device 151 and the volume-down function key 154 connected with the volume-down control device 152.

In an embodiment, the slide detection unit and the volume-up control device and the volume-down control device may be integrated into a printed circuit board (e.g., FPC), thereby forming an arrangement capable of not only controlling the volume but also adjusting the screen brightness of the display panel. In the above embodiment, the slide detection unit is configured to sensor the sliding touch action made by the user within the preset touch region, and when a finger of the user touches the screen and slides within the preset touch region, capacitors are formed between the finger of the user and the electrodes of the slide detection unit, such that currents are generated through the resistors respectively, the currents outputted from the slide detection unit are sensed by the sensors and sent to the processor, and the processor determines a direction in which the user makes the sliding touch action within the preset touch region based on a condition of change in the currents and thereby adjusts the brightness of the display panel. In an example, the sliding touch action made by the user within the preset touch region includes a sliding touch action made by the user in a direction from the volume-up function key 153 to the volume-down function key 154, or a sliding touch action made by the user in a direction from the volume-down function key 154 to the volume-up function key 153; when the volume-up function key 153 is pressed by the user, the processor receives a volume-up request and turns up the volume outputted from the display panel or a corresponding display device; when the volume-down function key 154 is pressed by the user, the processor receives a volume-down request and turns down the volume outputted from the display panel or display device. Further, Referring to FIG. 6, an interface that sends information about the volume-up request or volume-down request to the processor is different from an interface of the sensor from which the value of current is sent, thus a network used by the slide detection unit and a network used by the volume control devices are independent of each other, and the volume-up function key 153 and the volume-down function key 154 will not function unless being pressed. Accordingly, arrangement of the slide detection unit being disposed between the volume up control device and the volume down control device will not affect a normal operation of the display panel in the embodiments of the present disclosure.

Particular locations of the slide detection unit are described above by way of examples; in practice, the location of the slide detection unit is not limited to those described in the embodiments of the present disclosure, rather, they may include other locations known for those skilled in the art. Thus, the location of the slide detection unit is not limited herein.

Figure 7:
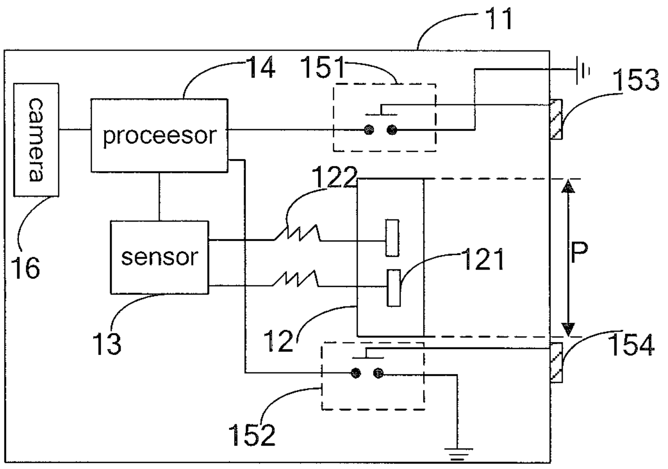
FIG. 7 is a schematic drawing showing a structure of a display panel according to a still further embodiment of the present disclosure.

Preferably, as shown in FIG. 7, the above display panel provided according to the embodiments of the present disclosure may further include a camera 16 connected with the processor.

In an example, the camera is configured to acquire an image of the user's eyes and send the acquired image to the processor, and the processor is further configured to adjust the screen brightness of the display panel based on an opening degree of the eye in the acquired image. For example, the processor is configured to determine the opening degree of the eye based on the acquired image, judge that the display panel has a stronger screen brightness to irritate the eye of the user if the opening degree of the eye is determined to be smaller based on the acquired image and thereby control to reduce or lower the brightness of the display panel, or is configured to judge that the display panel has a dimmer screen brightness such that the user can not clearly see the screen of the display panel and has to open his/her eyes wide if the opening degree of the eye is determined to be larger based on the acquired image and thereby control to increase or raise the brightness of the display panel.

Figure 8:
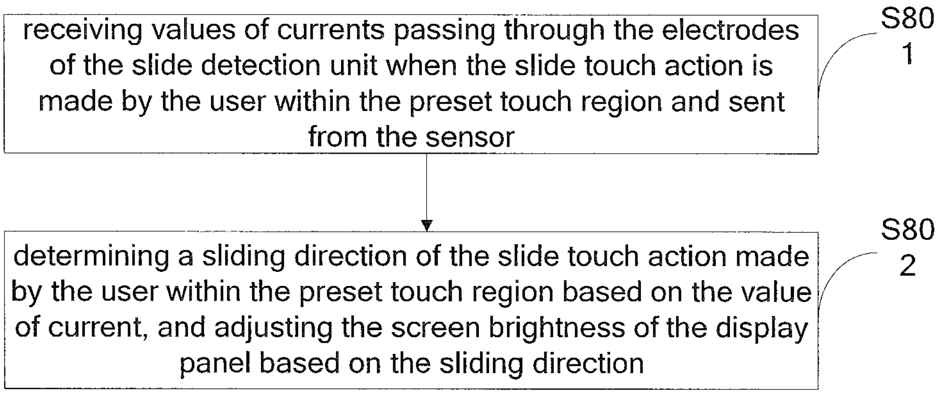
FIG. 8 is a flow chart showing, according to an embodiment of the present disclosure, a method of adjusting brightness of the display panel provided in embodiments of the present disclosure.

Based on the same inventive concept, an embodiment of the present disclosure further provides a method of adjusting the brightness of the display panel provided according to the embodiments of the present disclosure, as shown FIG. 8. The method comprises steps of:

S801: receiving the values of the currents sent from the sensor, the currents being generated due to the sliding touch action made by the user within the preset touch region and passing through the electrodes of the slide detection unit; and

S802: determining the sliding direction in which the sliding touch action is made by the user within the preset touch region based on the values of currents, and adjusting the screen brightness of the display panel based on the sliding direction.

In a preferable embodiment of the method of adjusting brightness of the above display panel, the step S802 may comprise:

performing data acquisition on the slide detection unit in a first direction by the sensor;

determining that the sliding touch action is made by the user in a first direction within the preset touch region if the received values of the currents reduce gradually in the first direction; and determining that the sliding touch action is made by the user in a second direction opposite to the second direction within the preset touch region if the received values of currents reduce gradually in the second direction.

Exemplarily, the first direction may be a left-to-right direction, a right-to-left direction, an up-to-down direction, or a down-to-up direction. If the first direction is the up-to-down direction, then the second direction is the down-to-up direction; if the first direction is the left-to-right direction, then the second direction is the right-to-left direction. For example, if the electrodes of the slide detection unit are arranged in the up-to-down direction or the down-to-up direction, the first direction may be the up-to-down direction or the down-to-up direction. If the electrodes of the slide detection unit are arranged in the left-to-right direction or the right-to-left direction, the first direction may be the left-to-right direction or the right-to-left direction. A direction in which data acquisition is performed by the sensor may be the same as or opposite to an arrangement direction of the electrodes of the slide detection unit, which will not be particularly limited in the embodiments of the present disclosure.

The finger of the user carries some electrostatic charges such that a capacitor will formed between the finger of the user and the electrode of the slide detection unit when the finger of the user slide within the preset touch region, and some of electrostatic charges will be carried away by the finger such that the currents generated due to the sliding and pass through the electrodes will reduce. Thus, when the finger of the user slides within the preset touch region, the current passing through the electrode corresponding to the finger user will reduce gradually. For example, if the sensor acquires data in the up-to-down direction, and if the value of current of the first acquired data corresponding to the electrode located at an upper position is smaller than corresponding data which is locally stored and if the value of current of the second acquired data corresponding to the electrode located at a lower position is smaller than corresponding data which is locally stored, it can be determined that the sliding direction of the user in the up-to-down direction in the touch region. If the sensor acquires data in the down-to-up direction, and if the value of current of the first acquired data corresponding to the electrode located at a lower position is smaller than corresponding data which is locally stored and if the value of current of the second acquired data corresponding to the electrode located at an upper position is smaller than corresponding data which is locally stored, it can be determined that the sliding direction of the user in the down-to-up direction in the touch region.

The sliding direction of the slide detection unit is described above by way of examples. In practice, the sliding direction of the slide detection unit is not limited to those described above in the embodiments of the present disclosure, and may include other directions known for those skilled in the art, which will not be limited herein.

In a preferable embodiment of the method of adjusting brightness of the above display panel, the step S802 may further comprise:

reducing or lowering the screen brightness of the display panel when it is determined that the sliding touch action is made by the user in the first direction within the preset touch region; and increasing or raising the screen brightness of the display panel when it is determining that the sliding touch action is made by the user in the second direction within the preset touch region.

Exemplarily, when the finger or another part of the user or another touch device slides within the preset touch region in the first direction, for example, slides in an up-to-down direction, a down-to-up direction, a left-to-right direction or right-to-left direction, the processor can raise or lower the screen brightness of the display panel based on the sliding direction. For example, the screen brightness of the display panel is decreased or lowered if the sliding touch action is in the first direction and increased or raised if the sliding is in the second direction opposite to the first direction. A correspondence between the direction and the control of the screen brightness is not particularly limited in embodiments of the present disclosure.

Based on the same inventive concept, an embodiment of the present disclosure further provides a display device, which comprises the display panel provided as described above. The display device may be a mobile phone, a tablet computer, a TV set, a display, a notebook PC, a digital picture frame, a navigator or any other products or components having a display function. Implementation of the display device may be referred to the embodiments of the display panel as described above, and will not be repeated herein.

The embodiments of the present disclosure provide a display panel and a method of adjusting brightness thereof, and a display device. The display panel comprises a slide detection unit including at least two electrodes independent of each other, a sensor and a processor. The slide detection unit is configured to sense a sliding touch action made by a user within a preset touch region of the display panel, the sensor is configured to sense the values of the currents generated by the electrodes of the slide detection unit when the sliding touch action is made by the user within the preset touch region, and to send the values of currents to the processor, and the processor is configured to determine a sliding direction in which the sliding touch action is made by the user within the preset touch region based on the values of the currents, and to adjust screen brightness of the display panel based on the sliding direction. Thus, the values of currents, which is generated by the slide detection unit of the display panel when the sliding touch action is made by the user within the preset touch region, is sensed by the sensor of the display panel and sent to the processor, and screen brightness of the display panel is adjusted by the processor based on the change in the values of currents. Thereby, with the display panel according to the embodiments of the present disclosure, adjustment of the brightness of the display panel can be achieved only through the sliding touch action made within the preset touch region of the display panel, thereby improving user experience.

Although several exemplary embodiments have been shown and described, it would be appreciated by those skilled in the art that various changes or modifications may be made in these embodiments without departing from the principle and spirit of the disclosure, the scope of which is defined in the claims and their equivalents.

What is claimed is:

1. A display panel, comprising:

a slide detection unit comprising at least two electrodes independent of each other;

a sensor;

a processor; and a plurality of resistors arranged to connect the sensor with the electrodes of the slide detection unit, wherein the slide detection unit is configured to sense a sliding touch action made by a user within a preset touch region of the display panel;

an arrangement direction of the at least two electrodes of the slide detection unit is the same as or opposite to a sliding direction of the sliding touch action;

the sensor is configured to sense values of currents passing through the electrodes of the slide detection unit when the sliding touch action is made by the user within the preset touch region and to send the values of the currents to the processor, the currents being generated due to the sliding touch action; and the processor is configured to determine the sliding direction of the sliding touch action based on the values of the currents, and to adjust screen brightness of the display panel based on the sliding direction, and wherein the processor is configured to determine that the sliding touch action is made by the user in the first direction within the preset touch region if the values of the currents reduce gradually in the first direction.

2. The display panel according to claim 1, wherein the electrodes of the slide detection unit are identical in structure and are arranged such that they have the same orientation.

3. The display panel according to claim 1, wherein the electrodes are provided within the preset touch region.

4. The display panel according to claim 1, wherein an input end of the sensor is connected with the slide detection unit and an output end of the sensor is connected with the processor.

5. The display panel according to claim 1, wherein each electrode is connected with the sensor via at least one of the resistors.

6. The display panel according to claim 1, wherein the slide detection unit is located between a volume-up control device and a volume-down control device of the display panel.

7. The display panel according to claim 1, wherein the electrodes of the slide detection unit each have a straight line or bar shape and are arranged in an up and down direction or a right and left direction of the display panel.

8. The display panel according to claim 1, wherein the electrodes of the slide detection unit each have a bended line or arrow shape and are arranged in an up and down direction or a right and left direction of the display panel.

9. The display panel according to claim 1, wherein the processor is configured to determine the sliding direction based on changes in the values of the currents from respective electrodes.

10. The display panel according to claim 1, further comprising a camera connected with the processor and configured to acquire an image of an eye of the user and send the acquired image to the processor, and the processor is further configured to adjust the screen brightness of the display panel based on an opening degree of the eye in the acquired image.

11. A display device, comprising the display panel according to claim 1.

12. The display device according to claim 11, wherein the electrodes of the slide detection unit are identical in structure and are arranged such that they have the same orientation.

13. The display device according to claim 11, wherein the electrodes are provided within the preset touch region.

14. The display device according to claim 11, wherein the slide detection unit is located between a volume-up control device and a volume-down control device of the display panel.

15. The display device according to claim 11, wherein the electrodes of the slide detection unit each have a straight bar or arrow shape and are arranged in an up and down direction or a right and left direction of the display panel.

16. The display device according to claim 11, further comprising a camera connected with the processor and configured to acquire an image of an eye of the user and send the acquired image to the processor, and the processor is further configured to adjust the screen brightness of the display panel based on an opening degree of the eye in the acquired image.

17. A method of adjusting brightness of the display panel according to claim 1, comprising:

receiving the values of currents sent from the sensor, the currents being generated due to the sliding touch action made by the user within the preset touch region and passing through the electrodes of the slide detection unit, wherein an arrangement direction of the at least two electrodes of the slide detection unit is the same as or opposite to a sliding direction of the sliding touch action; and determining the sliding direction of the sliding touch action made by the user within the preset touch region based on the values of currents, and adjusting the screen brightness of the display panel based on the sliding direction wherein determining the sliding direction of the sliding touch action is made by the user within the preset touch region based on the value of current comprises:

performing data acquisition on the slide detection unit in a first direction by the sensor; and determining that the sliding touch action is made by the user in the first direction within the preset touch region if the values of the currents received from the respective electrodes reduce gradually in the first direction.

18. The method according to claim 17, wherein determining the sliding direction of the sliding touch action is made by the user within the preset touch region based on the value of current further comprises:

determining that the sliding touch action is made by the user in a second direction opposite to the first direction within the preset touch region if the values of current received from the respective electrodes reduce gradually in the second direction.

19. The method according to claim 18, wherein adjusting the screen brightness of the display panel based on the sliding direction comprises:

lowering the screen brightness of the display panel when it is determined that the sliding touch action is made by the user in the first direction within the preset touch region; and raising the screen brightness of the display panel when it is determined that the sliding touch action is made by the user in the second direction within the preset touch region.

* * * * *